United States Patent
Narita et al.

(10) Patent No.: US 8,817,081 B2
(45) Date of Patent: Aug. 26, 2014

(54) IMAGE PROCESSING APPARATUS, IMAGE PROCESSING METHOD, AND PROGRAM

(75) Inventors: Tomoya Narita, Kanagawa (JP); Ryo Takaoka, Tokyo (JP); Kenichi Okada, Tokyo (JP); Shunichi Kasahara, Kanagawa (JP); Ritsuko Kano, Tokyo (JP)

(73) Assignee: Sony Corporation, Tokyo (JP)

(*) Notice: Subject to any disclaimer, the term of this patent is extended or adjusted under 35 U.S.C. 154(b) by 307 days.

(21) Appl. No.: 13/325,608

(22) Filed: Dec. 14, 2011

(65) Prior Publication Data

US 2012/0200678 A1   Aug. 9, 2012

(30) Foreign Application Priority Data

Dec. 22, 2010   (JP) ................. P2010-286317

(51) Int. Cl.
*H04N 13/04*   (2006.01)
(52) U.S. Cl.
USPC ........................................... 348/51
(58) Field of Classification Search
None
See application file for complete search history.

(56) References Cited

U.S. PATENT DOCUMENTS

| | | | |
|---|---|---|---|
| 6,608,622 B1 | 8/2003 | Katayama et al. | |
| 2001/0046314 A1* | 11/2001 | Neri et al. | 382/135 |
| 2007/0024614 A1* | 2/2007 | Tam et al. | 345/419 |
| 2008/0225040 A1* | 9/2008 | Simmons et al. | 345/419 |

FOREIGN PATENT DOCUMENTS

JP   8-116556   5/1996

* cited by examiner

*Primary Examiner* — Hung Dang
*Assistant Examiner* — Sunghyoun Park
(74) *Attorney, Agent, or Firm* — Sherr & Jiang, PLLC

(57) ABSTRACT

An apparatus for processing image data may include a receiving unit, which may be configured to receive first image data representing at least one first image. The apparatus may also include an edge data generating unit, which may be configured to generate edge data representing unidirectional edge components of the at least one first image. Additionally, the apparatus may include a display control unit, which may be configured to generate second image data representing at least one of a left-eye image or a right-eye image, based on the first image data and the edge data.

12 Claims, 7 Drawing Sheets

FIG. 3

ORIGINAL IMAGE

IMAGES FOR LEFT AND RIGHT EYES GENERATED FROM ORIGINAL IMAGE

FIG. 5

VERTICAL EDGE COMPONENT EXTRACTION

MAXIMAL CONTRAST IMAGE FROM VERTICAL EDGE COMPONENTS AND ORIGINAL IMAGE

わ　ら　や　ま　は　な　た　さ　か　あ
　　り　　み　ひ　に　ち　し　き　い
を　る　ゆ　む　ふ　ぬ　つ　す　く　う
　　れ　　め　へ　ね　て　せ　け　え
ん　ろ　よ　も　ほ　の　と　そ　こ　お

SYNTHESIS IMAGE

わ　ら　や　ま　は　な　た　さ　か　あ
　　り　　み　ひ　に　ち　し　き　い
を　る　ゆ　む　ふ　ぬ　つ　す　く　う
　　れ　　め　へ　ね　て　せ　け　え
ん　ろ　よ　も　ほ　の　と　そ　こ　お

IMAGES FOR LEFT AND RIGHT EYES GENERATED FROM SYNTHESIS IMAGE

ORIGINAL IMAGE

IMAGE AFTER COLLABORATIVE FILTERING OF VERTICAL EDGES

FIG. 11 VERTICAL EDGE COMPONENT EXTRACTION
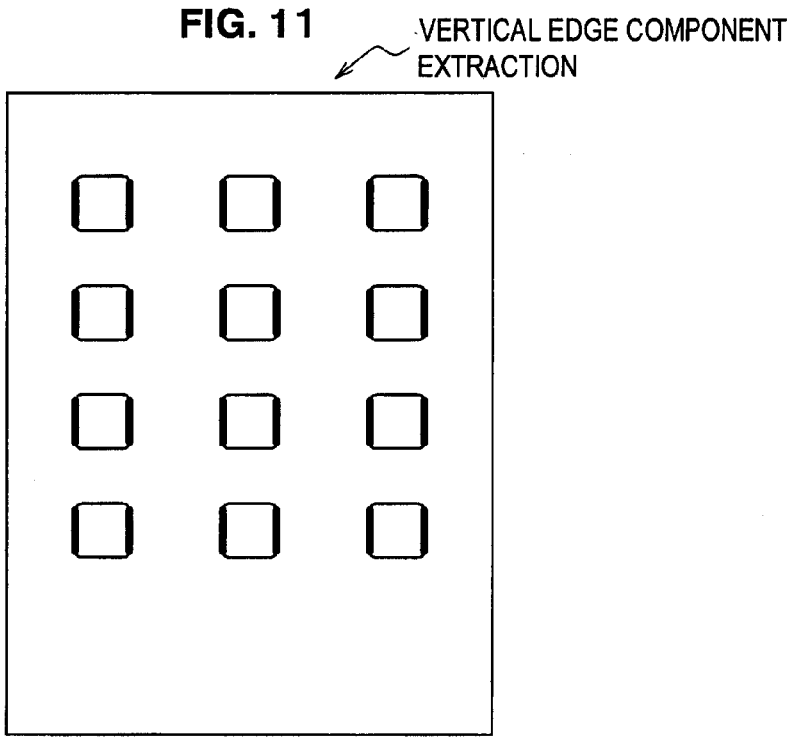
FIG. 12
VERTICAL EDGE COMPONENT SYNTHESIS → ICON SYNTHESIS
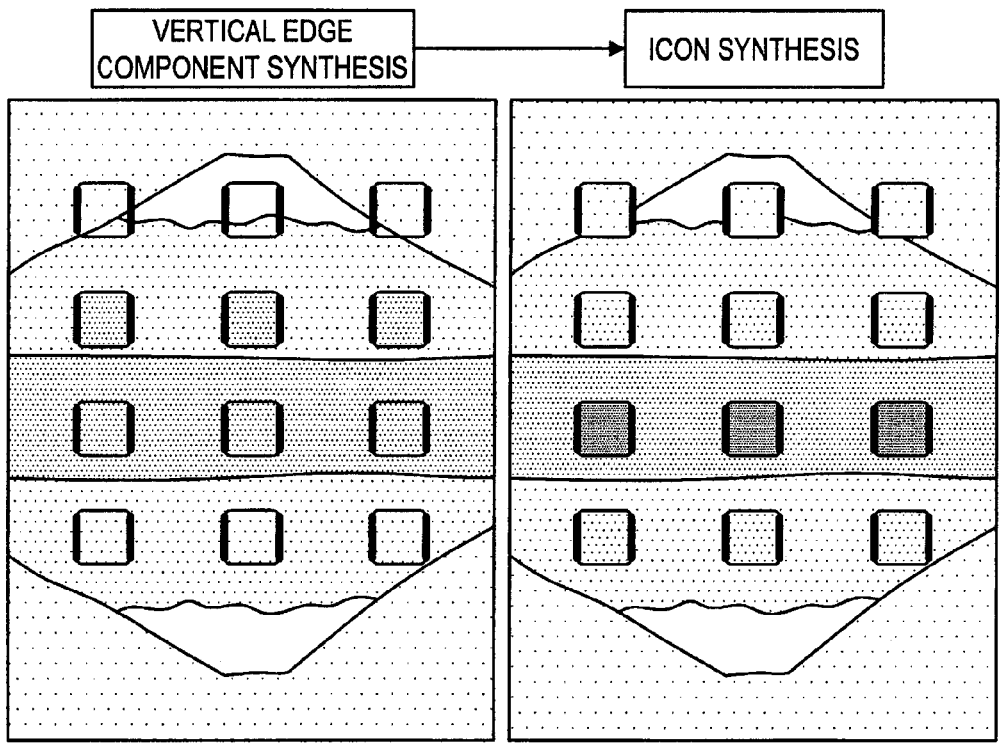

IMAGE PROCESSING APPARATUS, IMAGE PROCESSING METHOD, AND PROGRAM

CROSS-REFERENCE TO RELATED APPLICATION

This application claims priority of Japanese Patent Application No. 2010-286317, filed on Dec. 22, 2010, the entire content of which is hereby incorporated by reference.

BACKGROUND

The present disclosure relates to an image processing apparatus, an image processing method, and a program, and more particularly to an image processing apparatus, an image processing method, and a program suitable for a stereoscopic display.

Recently, stereoscopic displays for stereoscopically displaying content in virtual three-dimensional spaces have come into wide use (for example, Japanese Patent Application Publication No. 08-116556). When content is displayed in a virtual three-dimensional space, the content can be presented at any distance of a depth direction by shifting a left-eye image and a right-eye image, which respectively present content to left and right eyes, to the left and right on the stereoscopic display to display the images and adjusting a parallax amount at a shift level thereof.

SUMMARY

However, if an image contrast is low even when the parallax between the right-eye image and the left-eye image is generated, a user does not identify the parallax and it is difficult to form and stereoscopically view the right-eye image and the left-eye image.

A user interface provides the user with various information through a display. There may be images pre-designed and optimized for a stereoscopic display among images to be provided. However, a process of pre-designing images so that all the images to be provided to the user are easily stereoscopically viewed is impractical with a high load. In particular, it is difficult to consider the above-described situation in a user interface capable of manipulating various content in a free layout. Therefore, there is a need for a study for stereoscopic display optimization upon display.

It is desirable to provide a novel and improved image processing apparatus, image processing method, and program that can provide a user with images capable of being easily stereoscopically displayed by synthesizing vertical edge components of an image to be stereoscopically displayed.

Accordingly, there is disclosed an apparatus for processing image data. The apparatus may include a receiving unit, which may be configured to receive first image data representing at least one first image. The apparatus may also include an edge data generating unit, which may be configured to generate edge data representing unidirectional edge components of the at least one first image. Additionally, the apparatus may include a display control unit, which may be configured to generate second image data representing at least one of a left-eye image or a right-eye image, based on the first image data and the edge data.

There is also disclosed a method of processing image data. A processor may execute a program to cause an apparatus to perform the method. The program may be stored on a memory of the apparatus and/or on a non-transitory, computer-readable storage medium. The method may include receiving first image data representing at least one first image. Additionally, the method may include generating edge data representing unidirectional edge components of the at least one first image. The method may also include generating second image data representing at least one of a left-eye image or a right-eye image, based on the first image data and the edge data.

According to the embodiments of the present disclosure described above, it is possible to provide a user with images capable of being easily stereoscopically displayed by synthesizing vertical edge components of an image to be stereoscopically displayed.

BRIEF DESCRIPTION OF THE DRAWINGS

FIG. 3 is an example of an original image (i.e., a first image represented by first image data) acquired by the image processing apparatus according to the first embodiment;

FIG. 4 shows images for left and right eyes from the original image of FIG. 3;

FIG. 5 is an image obtained by extracting vertical edge components (i.e., generating edge data representing unidirectional edge components) of the original image of FIG. 3;

FIG. 11 is an image obtained by extracting vertical edge components of the image of FIG. 10;

FIG. 12 is an image obtained by synthesizing the vertical edge components of FIG. 11 with icons in a luminance inversion color of a background.

DETAILED DESCRIPTION OF THE EMBODIMENT(S)

Figure 1:
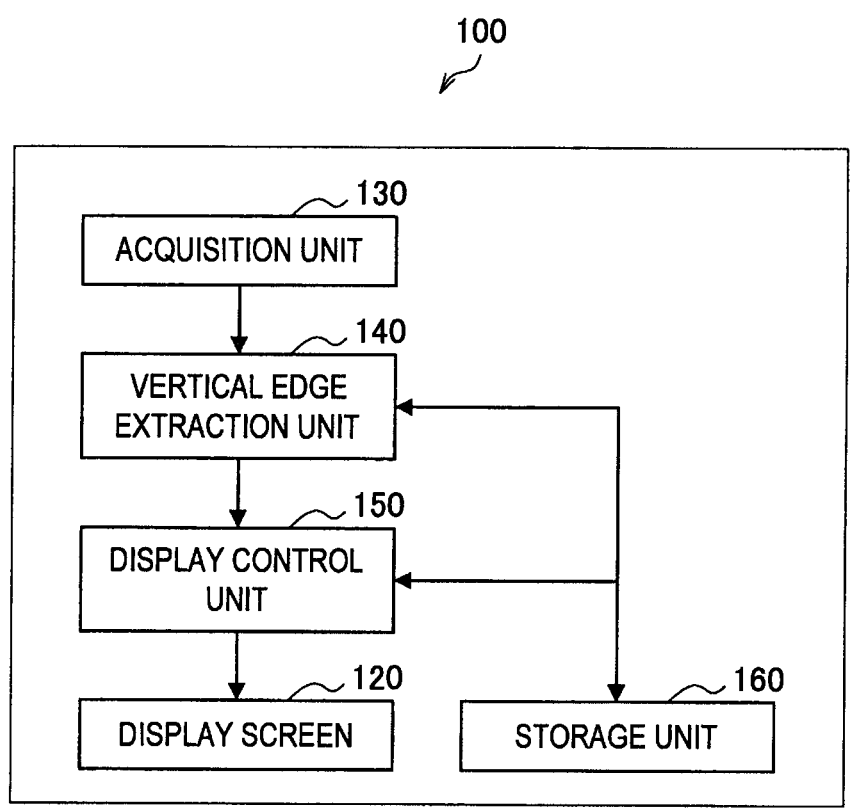
FIG. 1 is a block diagram showing a functional configuration of an image (i.e., image data) processing apparatus according to a first embodiment of the present disclosure.

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted. Note also that, as used herein, the indefinite articles "a" and "an" mean "one or more" in open-ended claims containing the transitional phrase "comprising," "including," and/or "having."

Description will be given in the following order.
<First Embodiment>
1-1. Configuration of Image Processing Apparatus (Vertical Edge Extraction)
1-2. Operation of Image Processing Apparatus \<Second Embodiment\>
\<Summary\>
\<First Embodiment\>

1-1. Configuration of Image Processing Apparatus

First, the configuration of the image processing apparatus according to the first embodiment of the present disclosure will be described with reference to FIG. 1. FIG. 1 shows a functional configuration of an image processing apparatus 100. The image processing apparatus 100 has a display screen 120, an acquisition unit (i.e., a software module, a hardware module, or a combination of a software module and a hardware module) 130, a vertical edge extraction unit (i.e., an edge data generating unit) 140, a display control unit 150, and a storage unit (i.e., a memory) 160. The image processing apparatus 100 may be, for example, a personal computer (PC), a television, a music player, a game machine, a mobile phone, or a portable type terminal.

The display screen 120 is a display capable of stereoscopic display to display stereoscopic images. The display screen 120 is, for example, a display such as a liquid crystal display (LCD), a plasma display panel (PDP), or an organic electroluminescence (EL) panel. As a display method when the display screen 120 displays stereoscopic images, for example, there is a method of viewing viewpoint images (or parallax images) based on different polarization states for two eyes using polarizing glasses. Also, any method such as a method of optically guiding predetermined viewpoint images of a plurality of viewpoint images to the eyes of viewers using parallax barriers or lenticular lenses without eye-glasses, or a frame sequential method may be used.

In the image processing apparatus 100, it is not necessary to include the above-described components in the same housing. For example, the display screen 120 may be integrated with the image processing apparatus 100 as shown and provided on its surface, or may be independently provided without being included in the image processing apparatus 100.

The acquisition unit (i.e., the receiving unit) 130 acquires (i.e., receives) an image (original image). The acquired image is not limited to a stereoscopic image, and may be any one of an image acquired from a webpage, an image stored in the storage unit 160, an image capable of being acquired via a network, and the like, or may be a 2D image, or a 3D image. FIG. 3 shows an example of an original image, which is an acquired 2D image.

(Vertical Edge Extraction)

A glasses-free stereoscopic display using a binocular parallax implements stereoscopic images by generating the parallax with left and right shifts of a left-eye image and a right-eye image to be displayed to the two left and right eyes according to depth distances at which the images are stereoscopically displayed. However, in this case, it is difficult to identify the presence of a parallax even when a left/right parallax is generated in a low contrast state in which image information itself to be stereoscopically displayed or peripheral image information has the same type of color without naturally considering peripheral information for the image information to be displayed.

Specifically, when the parallax is generated by shifting the image information to be displayed in a left/right direction, a contrast between an image to be stereoscopically displayed and a peripheral image is necessary to a certain extent so as to identify the same stereoscopic target from a left-eye image and a right-eye image by recognizing the shift. Because an original image having many vertical edge components has more points serving as identification targets of the images for the left and right eyes than an original image having few vertical edge components, the original image having many vertical edge components is likely to be appropriate as a stereoscopic image.

A user interface provides the user with various information through a display. There may be images pre-designed and optimized for stereoscopic display among images to be provided. However, a process of pre-designing images so that all the images to be provided to the user are easily stereoscopically viewed is impractical with a high load. In particular, it is difficult to consider the above-described situation in a user interface capable of manipulating various content in a free layout, and therefore a study for stereoscopic display optimization upon display is necessary.

In this embodiment, vertical edge processing is executed to increase the number of vertical edge components to be included in any display image, and image content suitable for the stereo vision is generated. Specifically, first, the vertical edge extraction unit 140 extracts vertical edge components from an original image.

For example, in an original image of FIG. 3, not only is a contrast within characters (content) low, but a contrast between the characters and a background is also low. If a left-eye image and a right-eye image having left and right parallaxes are generated from the original image, shifts of the left-eye image and the right-eye image are ambiguous and unclear as shown in FIG. 4. There is a point at which it is difficult to distinguish a boundary between the left-eye image and the right-eye image because of the same hue in the left-eye image and the right-eye image as well as a weak contrast from the background and there is the case in which it is difficult to decide a parallax amount by a content shape.

In order to emphasize the shifts of the left-eye image and the right-eye image, vertical edges of contours of the left-eye image and the right-eye image may be emphasized as described above. According to this, it is easy for the user to recognize a parallax amount and stereoscopically view images because the shifts of the left-eye image and the right-eye image are emphasized.

Characters may be contoured in place of the emphasis of the vertical edges of the contours. However, if the characters are contoured, the number of feature points is increased in horizontal edges as well as vertical edges of the characters. Eventually, it is difficult to feel left and right shifts and a stereoscopic display operation becomes difficult. If the characters are contoured, there is a problem in that an impression of the original image is unnecessarily changed. On the other hand, according to image processing of emphasizing the vertical edges, it is easy to feel the left and right shifts and the stereoscopic display operation is facilitated because the number of feature points on vertical edge sides of the characters is increased and the number of feature points on horizontal edge sides is not increased. Also, according to the image processing of emphasizing the vertical edges, the impression of the original image is not unnecessarily changed.

In this embodiment, the image processing of emphasizing the vertical edges is executed as an effective method for highlighting the left/right parallax. For example, the original image is filtered by a convolution filter using the following matrix. As a result, it is possible to extract vertical edge components as shown in FIG. 5.

[Formula 1]

$$\begin{array}{|c|c|c|} \hline 1 & -2 & 1 \\ \hline 1 & -2 & 1 \\ \hline 1 & -2 & 1 \\ \hline \end{array} \quad (1)$$

Convolution Filter of MATRIX

A center pixel of the above-described convolution filter is its own pixel. The original image is convoluted with numerical values around its own pixel. According to this, pixels on the left and right of the center pixel are emphasized among 8 pixels surrounding the center pixel because differences between the center pixel and the left and right pixels are large. Because a difference between the center pixel and an upper/lower pixel is absent in a convolutional numerical value, emphasis is not made so that the upper/lower pixel is the same as its own pixel. A filter that emphasizes vertical edges is selected as the convolution filter, thereby extracting vertical edge components as shown in FIG. 5. Thus, the vertical edge extraction unit 140 extracts vertical edge components of main contour parts of the original image.

The display control unit 150 decides (i.e., modifies) a display color of the vertical edge components so that the contrast between the vertical edge components and the original image is high. For example, the color of the original image of FIG. 3 is light gray. In this case, it is preferable that the display color of the vertical edge components be an inversion color of the original image so that the contrast between the vertical edge components and the original image is high. For example, it is preferable that the display color of the vertical edge components be black, dark gray, or the like.

Figures 6, 7, 8:
FIG. 6 is a maximal contrast image from the vertical edge components of FIG. 5 and the original image.
FIG. 7 is a synthesis image from the original image of FIG. 3 and the vertical edge components of FIG. 5.
FIG. 8 shows images for left and right eyes (i.e., left-eye and right-eye images represented by second image data) generated from the synthesis image of FIG. 7.

In addition, it is more preferable that the display control unit 150 decide the display color of the vertical edge components so that a contrast between the original image and its background image is high. For example, a color inverse to a background color may be selected from a template of the background of the original image and the selected color may be the display color of the vertical edge components. FIG. 6 shows a contrast between the original image of FIG. 3 and the vertical edge components of FIG. 5 and a maximal contrast image from the original image and its background image. Here, because the background is white and the content is dark, the extracted vertical edge components are set to black or dark gray.

The decision of the display color of the vertical edge components is a requisite for increasing the contrast between the vertical edge components and the original image, but the decision of the display color of the vertical edge components is not a requisite for increasing the contrast between the original image and its background image. However, it is preferable to decide the display color of the vertical edge components by also considering the contrast from the background image.

The display control unit 150 synthesizes the vertical edge components of FIG. 6 with the original image of FIG. 3. According to this, the vertical edge components of the decided display color are synthesized with the original image in a closed range within an area of the original image. At this time, because the vertical edge components are more or less conspicuous, it is preferable to naturally synthesize an image by adding a blur such as a Gaussian blur to the image. An image synthesized as described above is shown in FIG. 7.

The display control unit 150 generates images for the left and right eyes from the synthesized original image. The generated images for the left and right eyes are shown in FIG. 8. In the images for the left and right eyes obtained as described above, at least the vertical edges of the original image content are emphasized. In this embodiment, the display color of the vertical edge components is decided so that the contrast between the vertical edge components and the original image is high and the contrast between the original image and its background image is high. Consequently, in this embodiment, the vertical edges for the original image content and the background content are emphasized.

Thus, a comparative review is made between images for the left and right eyes (FIG. 8) generated from the synthesis image (FIG. 7) for which the vertical edge processing is performed and images for the left and right eyes (FIG. 4) generated from the original image (FIG. 3) for which no vertical edge processing is performed. Because the contrast of images themselves to be stereoscopically displayed or peripheral background images in the same type of color is low in the images for the left and right eyes (FIG. 4) generated from the original image, the number of vertical edge components is small in the original image and it is difficult to identify a parallax even when the left/right parallax is generated. On the other hand, because the contrast of images themselves to be stereoscopically displayed or peripheral background images is high in the images for the left and right eyes (FIG. 8) generated from the original image for which the vertical edge processing is performed, it can be seen that the number of points serving as identification targets in the images for the left and right eyes is greater than that in the original image, shifts of the images for the left and right eyes are easily visually recognized, and the images are appropriate as stereoscopic images.

The display control unit 150 is an arithmetic processing device for a display, and can be implemented, for example, by a graphics processing unit (GPU), a central processing unit (CPU), a digital signal processor (DSP), or the like.

A program for implementing the function of the display control unit 150 may be stored in a disc-shaped recording medium (i.e., a non-transitory, computer-readable storage medium) or a removable storage medium (i.e., a non-transitory, computer-readable storage medium) such as a memory card and provided to the image processing device 100, or may be downloaded to the image processing apparatus 100 via a network such as a local area network (LAN) or the Internet. The display control unit 150 may store the acquired program in the storage unit 160 and operate according to a stored program.

In addition to the above-described program, data necessary for processing in the image processing apparatus 100 is stored in the storage unit 160. In this embodiment, the storage unit 160 may be, for example, a storage device such as a random access memory (RAM) or a read only memory (ROM). Also, the storage unit 160 may be a removable storage medium such as an optical disc, a magnetic disk, or a semiconductor memory, or a combination of the storage device and the removable storage medium. For example, the program for implementing the function of the display control unit 150 or the like to be executed by the CPU, the DSP, or the like may be stored in the storage unit 160.

1-2. Operation of Image Processing Apparatus

Figure 2:
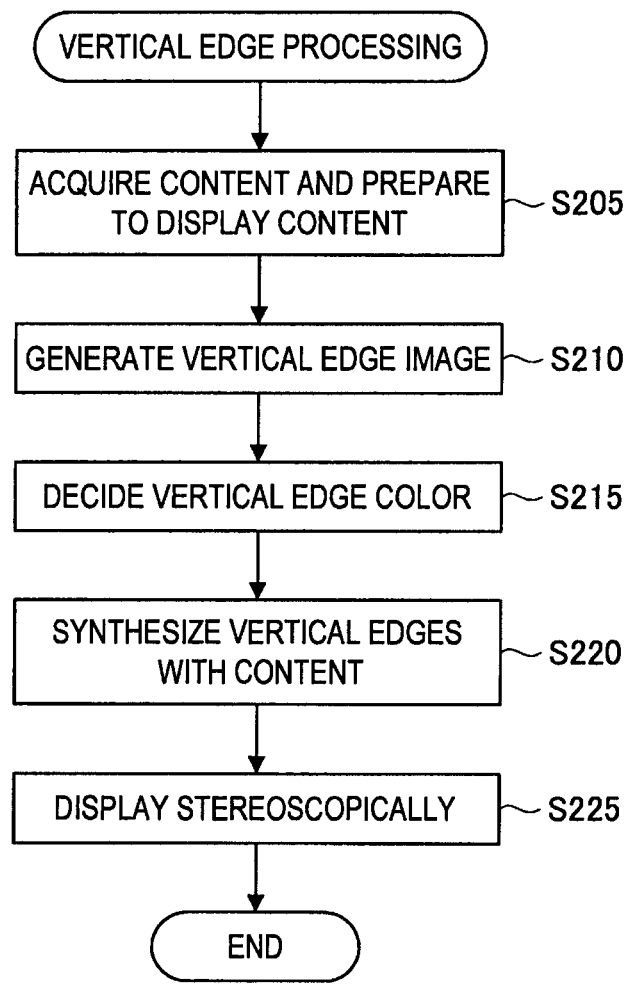
FIG. 2 is a flowchart showing vertical edge processing by the image processing apparatus according to the first embodiment.

Next, the vertical edge processing according to this embodiment will be described with reference to FIG. 2. The vertical edge processing according to this embodiment is executed in a step of preparing a display operation when an image is displayed.

First, in step S205, the acquisition unit 130 acquires content of an original image and prepares to display the content of the original image. Next, in step S210, the display control unit 150 generates vertical edge components (see FIG. 5). Next, in step S215, the display control unit 150 decides a display color of the vertical edge components (see FIG. 6).

Next, in step S220, the display control unit 150 synthesizes the vertical edge components of the decided color with the original image (see FIG. 7). Subsequently, in step S225, the display control unit 150 generates images for the left and right eyes from a synthesis image and stereoscopically displays the images (see FIG. 8).

As described above, according to the image processing apparatus 100 related to this embodiment, it is possible to provide the user with images capable of being easily stereoscopically displayed by executing the above-described vertical edge processing for the images to be stereoscopically displayed dynamically in the display preparation step.

<Second Embodiment>

Next, an operation of the image processing apparatus 100 according to the second embodiment of the present disclosure will be described with reference to FIGS. 9 to 13. The acquisition unit 130 acquires an image shown in FIG. 9 as an original image. In the original image of FIG. 9, a wallpaper settable by the user himself/herself is designated as a background image, and application icons capable of being added by the user himself/herself are arranged on the wallpaper. Because the icons and the background are superimposed in the same type of color in the original image of FIG. 9, the stereo vision is difficult even when the icons are prominent from the background image.

The original image and the background image are respectively filtered for a vertical edge emphasis by a convolution filter using the following matrix.

[Formula 2]

$$\begin{array}{|c|c|c|} \hline -1 & 3 & -1 \\ \hline -1 & 3 & -1 \\ \hline -1 & 3 & -1 \\ \hline \end{array} \quad (2)$$

Convolution Filter of 1/3

Figure 10:
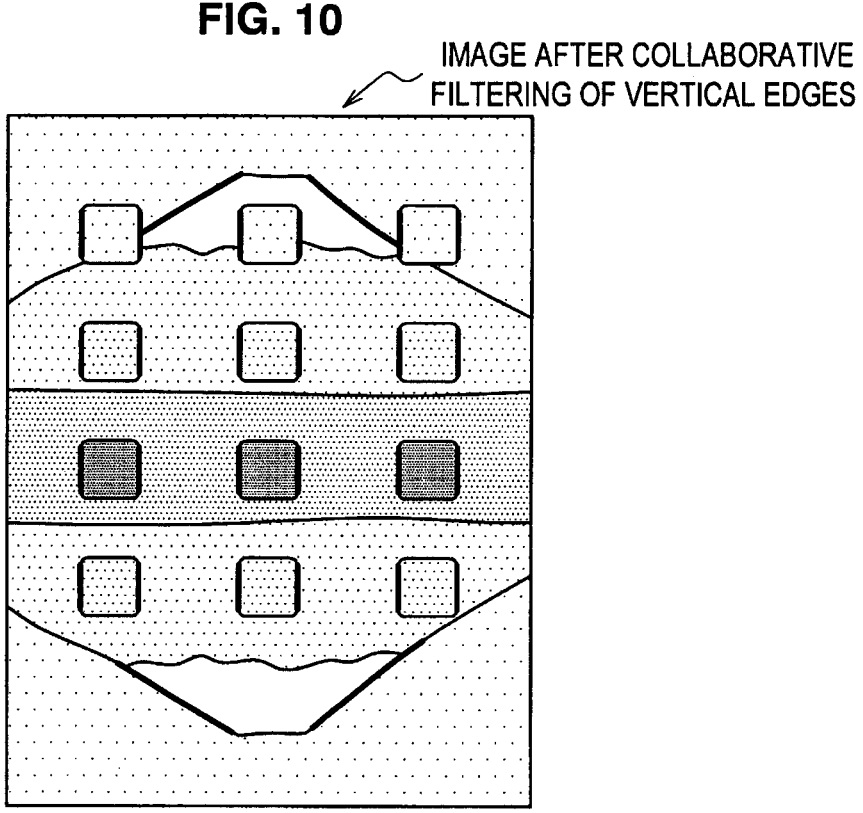
FIG. 10 is an image obtained by applying a vertical edge emphasis filter to the original image of FIG. 9.

FIG. 10 shows a result obtained by applying the icons of the original image and the background image to the above-described convolution filter. When the vertical edges of the icons and the background image are emphasized, icons having a color close to a background color are less visible consistently. Consequently, the stereo vision of the icons from the background image is difficult even when the image including the icons and the background image passes through the filter, which emphasizes the vertical edges.

Figure 9:
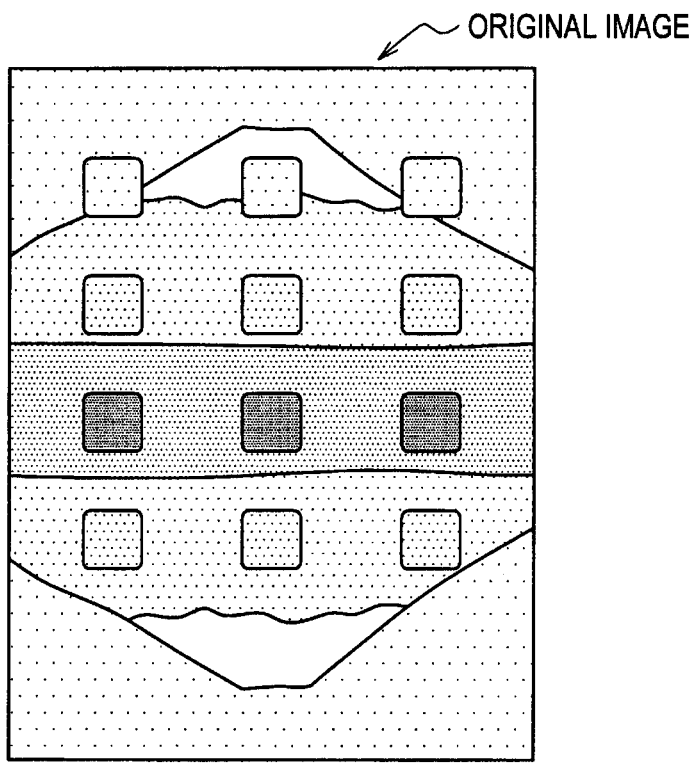
FIG. 9 is an example of an original image acquired by an image processing apparatus according to a second embodiment.

On the other hand, in this embodiment, first, the vertical edge extraction unit 140 extracts the vertical edge components from the original image of FIG. 9. The convolution filter is the same as the convolution filter described in the first embodiment. As a result, main vertical edge components of icon contour parts are extracted as shown in FIG. 11.

Next, the display control unit 150 decides a display color of the vertical edge components in an inversion color of a background luminance so that a contrast between the icons of the original image and the background image is high. A left drawing of FIG. 12 is an image obtained by superimposing the vertical edge components of FIG. 11 on the background in the inversion color of the background luminance. A right drawing of FIG. 12 is an image obtained by further superimposing the icons of the original image on the left drawing of FIG. 12.

Figure 13:
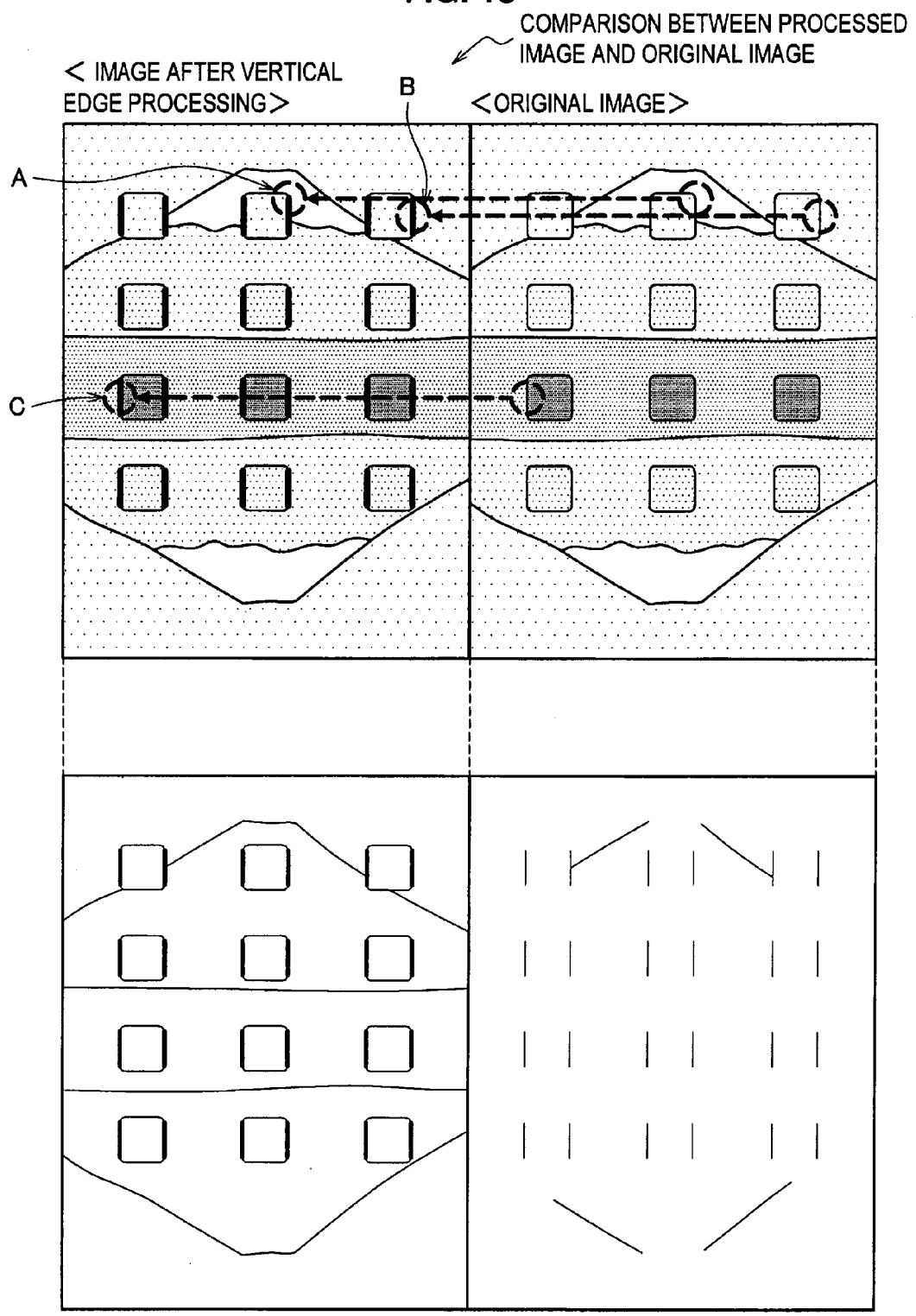
FIG. 13 is an image obtained by extracting the vertical edge components of the image of FIG. 12.

Thus, the image obtained by applying the vertical edge processing is compared with the original image. A top left drawing of FIG. 13 is an image after the vertical edge processing. A top right drawing of FIG. 13 is an original image for which no vertical edge processing is performed. If a bottom left image of FIG. 13 obtained by extracting the vertical edge components from the image after the vertical edge processing is compared with a bottom right image of FIG. 13 obtained by extracting the vertical edge components from the original image, the contour of each icon becomes clear in the image after the vertical edge processing because there are obviously many vertical edge components from the original image. For example, if the images on the top left and the top right of FIG. 13 are compared, it can be seen that vertical contours from the original image are emphasized in the image after the vertical edge processing in points A, B, and C where the icons and the background have the same type of color and the stereo vision is more facilitated than that of the original image.

As described above, according to the image processing apparatus 100 in the this embodiment, it is possible to provide the user with images capable of being easily stereoscopically displayed by performing a process of dynamically synthesizing the vertical edge components with the original image to be stereoscopically displayed, similar to the first embodiment.

Furthermore, in the image processing apparatus 100 according to this embodiment, the contrast between the icons and the background is changed according to a movement of the icon. The same is true even when the user changes the background wallpaper. According to such object movement or background change, the display control unit 150 re-decides the display color of the vertical edge components so that the contrast between the original image and the background image is high. The display control unit 150 synthesizes the extracted vertical edge components with the original image in the re-decided color, and generates images for the left and right eyes from the synthesized original image.

An object such as an icon usually moves on the display screen 120. In this case, when the icon and the background have the same type of color, the stereo vision of the icon becomes difficult. In this situation, according to this embodiment, even when the icon moves or the background changes, the vertical edge processing is also dynamically executed correspondingly. Thereby, it is possible to provide the user with images capable of being easily stereoscopically displayed in any situation.

The vertical edge processing may be executed every time a predetermined period of time has elapsed. If the user has selected original content, vertical edge processing may be dynamically executed according to the selection. The vertical edge processing may be executed after a background itself or a background color dynamically changes so that the contrast from an object, which is an original image, is conspicuous. In a superimposed image, the vertical edge processing is executed for each pixel.

SUMMARY

As described above, according to the image processing apparatus 100 in the first and second embodiments, it is possible to provide the user with images capable of being easily stereoscopically displayed by executing image processing of dynamically synthesizing an image to be stereoscopically displayed with vertical edge components in a display preparation step. In particular, in each embodiment, image processing of emphasizing the vertical edge components in any content is executed as described above. As a result, it is possible to reduce the effort of pre-checking content and a content arrangement state upon development and adding image processing for facilitating the stereo vision upon development according to a check result. Thereby, it is possible to facilitate the development of stereoscopic content.

The display control unit 150 may designate an image acquired by the acquisition unit 130 as an original image, determine whether a synthesis of vertical edge components is necessary for each original image, and synthesize the extracted vertical edge components with the above-described original image only when the synthesis is determined to be necessary. According to this, an object such as an image that is not optimized, an image incapable of being pre-designed, or a button of which creativity is not high becomes a processing target. Thus, it is possible to avoid an unnecessary increase of a processing load by performing vertical edge processing for an image in which it is easy to show the effect of vertical edge processing without performing vertical edge processing for an image in which it is difficult to show the effect of vertical edge processing.

For example, the display control unit 150 may determine whether the synthesis is necessary on the basis of extracted vertical edge components and depth information provided in images for left and right eyes. For example, when the vertical edge components are compared with the depth information, the display control unit 150 determines that the synthesis is necessary by recognizing the image as an image in which it is difficult to emphasize vertical edges or an unoptimized image if a vertical edge component amount is small as compared with a depth amount of the image recognizable from the depth information. On the other hand, if the vertical edge component amount is extracted to a significant extent with respect to the depth information, the display control unit 150 determines that the synthesis is unnecessary by recognizing the image as an image in which it is easy to emphasize vertical edges or an optimized image. According to this, it is possible to exclude an image pre-designed or optimized for a stereoscopic display operation or an image having a clear contrast from a background from a vertical edge processing target according to this embodiment.

The display control unit 150 may determine that the synthesis of the vertical edge components is necessary according to a manipulation from the user. For example, it is possible to exclude an image for which a content creator does not want to perform image processing based on content from a vertical edge processing target according to this embodiment by considering an intention of a content creator side for image content and a user who hates an impression change.

In the above embodiments, the operations of the units are related to each other. The operations may thus be replaced with a series of operations and a series of processes in consideration of the relations. Thereby, an embodiment of an image processing apparatus can be an embodiment of an image processing method and an embodiment of a program for causing a computer to implement a function provided in the image processing apparatus.

It should be understood by those skilled in the art that various modifications, combinations, sub-combinations and alterations may occur depending on design requirements and other factors insofar as they are within the scope of the appended claims or the equivalents thereof.

For example, the display control unit 150 may add a drop shadow onto a synthesis image in which vertical edges are emphasized. For example, the drop shadow on the image may be added in an obliquely right downward position of an image after vertical edge processing. Thereby, it is possible to provide the user with images capable of being easily stereoscopically displayed and change an impression of an image by image processing for prominence from content.

After a synthesis image is generated in which vertical edges are emphasized, the display control unit 150 can customize the image. For example, the display control unit 150 can adjust the contrast of the synthesis image according to a manipulation of the user. The display control unit 150 may perform a process of de-emphasizing horizontal edges of a synthesis image in which vertical edges are emphasized. Customization may be set by a default or may be automatically processed on the basis of its value. Also, the customization may be processed according to a selection of the user by allowing the user to perform the selection using a selection screen. As described above, the user side can decide whether to perform the vertical edge processing for an original image or whether to perform the customization. In particular, the present disclosure is effective in an image of which creativity is high. As described above, the display control unit 150 can change the contrast by the drop shadow according to a background image.

In the above-described embodiment, images for left and right eyes are generated from a synthesis image after vertical edge components are extracted from an original image and the extracted vertical edge components are synthesized (i.e., combined) with the original image. However, the present disclosure is not limited thereto. For example, vertical edge components are extracted from images for left and right eyes and the extracted vertical edge components are synthesized with the images for the left and right eyes, so that images of the left and right eyes may be generated.

What is claimed is:

1. An apparatus for processing image data, comprising:
   a receiving unit configured to receive first image data representing at least one first image;
   an edge data generating unit configured to generate edge data representing unidirectional edge components of the at least one first image; and
   a display control unit configured to generate second image data representing at least one of a left-eye image or a right-eye image, based on the first image data and the edge data,
   wherein the display control unit is configured to generate the second image data by modifying the edge data,
   wherein the display control unit is configured to generate the second image data by modifying a color of the edge components represented by the edge data, and
   wherein the display control unit is configured to generate the second image data by inverting a color of the edge components represented by the edge data.

2. The apparatus of claim 1, wherein the display control unit is configured to generate the second image data by, after modifying the color of the edge components, combining the edge components with the at least one first image to create the at least one of a left-eye image or a right-eye image represented by the second image data.

3. The apparatus of claim 2, wherein the display control unit is configured to generate the second image data by blurring the at least one of a left-eye image or a right eye image.

4. The apparatus of claim 1, wherein the edge data generating unit is configured to generate the edge data by filtering with a convolution filter the at least one first image.

5. The apparatus of claim 1, wherein the display control unit is configured to generate second image data representing at least one of a left-eye image and a right-eye image.

6. The apparatus of claim 1, wherein the edge data generating unit is configured to generate edge data representing vertical edge components of the at least one first image.

7. The apparatus of claim 1, wherein the display control unit is configured to selectively generate the second image data based on the first image data.

8. The apparatus of claim 1, wherein the display control unit is configured to selectively generate the second image data based on the edge data.

9. The apparatus of claim 1, wherein the display control unit is configured to selectively generate the second image data based on a user input.

10. An apparatus for processing image data, comprising:
a memory storing a program; and
a processor configured to execute the program to cause the apparatus to perform a method of processing image data, the method comprising:
  receiving first image data representing at least one first image;
  generating edge data representing unidirectional edge components of the at least one first image; and
  generating second image data representing at least one of a left-eye image or a right-eye image, based on the first image data and the edge data,
wherein the second image data is generated by modifying the edge data,
wherein the second image data is generated by modifying a color of the edge components represented by the edge data, and
wherein the second image data is generated by inverting a color of the edge components represented by the edge data.

11. A method of processing image data, comprising:
receiving first image data representing at least one first image;
generating edge data representing unidirectional edge components of the at least one first image; and
generating second image data representing at least one of a left-eye image or a right-eye image, based on the first image data and the edge data,
wherein the second image data is generated by modifying the edge data,
wherein the second image data is generated by modifying a color of the edge components represented by the edge data, and
wherein the second image data is generated by inverting a color of the edge components represented by the edge data.

12. A non-transitory, computer-readable storage medium storing a program that, when executed by a processor, causes an image processing apparatus to perform a method of processing image data, the method comprising:
receiving first image data representing at least one first image;
generating edge data representing unidirectional edge components of the at least one first image; and
generating second image data representing at least one of a left-eye image or a right-eye image, based on the first image data and the edge data,
wherein the second image data is generated by modifying the edge data,
wherein the second image data is generated by modifying a color of the edge components represented by the edge data, and
wherein the second image data is generated by inverting a color of the edge components represented by the edge data.

\* \* \* \* \*